US009069055B2

(12) United States Patent
Shin et al.

(10) Patent No.: US 9,069,055 B2
(45) Date of Patent: Jun. 30, 2015

(54) WIRELESS POSITIONING METHOD AND APPARATUS USING WIRELESS SENSOR NETWORK

(71) Applicant: SOONGSIL UNIVERSITY RESEARCH CONSORTIUM TECHNO-PARK, Seoul (KR)

(72) Inventors: Yo An Shin, Seoul (KR); Jian Shi, Seoul (KR); Ai Lan Hong, Seoul (KR); Kwang Yul Kim, Seoul (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 100 days.

(21) Appl. No.: 14/092,964

(22) Filed: Nov. 28, 2013

(65) Prior Publication Data
US 2014/0153424 A1 Jun. 5, 2014

(30) Foreign Application Priority Data

Nov. 30, 2012 (KR) ........................ 10-2012-0137718

(51) Int. Cl.
H04W 24/00 (2009.01)
G01S 5/02 (2010.01)
(52) U.S. Cl.
CPC .................... G01S 5/0289 (2013.01)

(58) Field of Classification Search
None
See application file for complete search history.

(56) References Cited

U.S. PATENT DOCUMENTS

| 8,175,613 | B2 * | 5/2012 | Patil et al. .................. 455/456.1 |
| 2007/0159986 | A1 * | 7/2007 | Park et al. ..................... 370/254 |
| 2009/0159986 | A1 * | 6/2009 | Kim ............................... 257/401 |
| 2011/0188289 | A1 * | 8/2011 | Chevallier et al. ............ 365/148 |

FOREIGN PATENT DOCUMENTS

KR 10-1163335 B1 7/2012

* cited by examiner

Primary Examiner — John Blanton
(74) Attorney, Agent, or Firm — Revolution IP, PLLC

(57) ABSTRACT

Provided is a wireless positioning method using a wireless sensor network, for estimating a position of an unknown node that is a positioning target by using a plurality of anchor nodes arranged at regular intervals, the wireless positioning method including: setting a plurality of test nodes at regular intervals on a space formed by some of the plurality of anchor nodes; obtaining a number and position information of anchor nodes within a predetermined distance from the unknown node; detecting at least one test node matching the obtained number and position information; and estimating a position of the unknown node by calculating an average coordinate value of the detected at least one test node.

10 Claims, 7 Drawing Sheets (a)

(b)

(a)

(b)

WIRELESS POSITIONING METHOD AND APPARATUS USING WIRELESS SENSOR NETWORK

CROSS-REFERENCE TO RELATED PATENT APPLICATION

This application claims the benefit of Korean Patent Application No. 10-2012-0137718, filed on Nov. 30, 2012, in the Korean Intellectual Property Office, the disclosure of which is incorporated herein in its entirety by reference.

BACKGROUND OF THE INVENTION

1. Field of the Invention

The present invention relates to a wireless positioning method and apparatus using wireless sensor network, and more particularly, to a wireless positioning method and apparatus using a wireless sensor network, wherein a localization error generated in a general wireless centroid localization (WCL) algorithm is prevented.

2. Description of the Related Art

Generally, since the sensor in wireless sensor network has low power, low complexity, and intelligent characteristics, almost all the positioning algorithms using the wireless sensor network will require a simple structure and a quick operation speed. Location information of an anchor node whose actual position is known is usually used to estimate a position of an unknown node in a sensor network. Basically, anchor nodes determine their actual positions by using global positioning system (GPS) information or pre-stored position information. In reality, installation of anchor nodes in most positioning is inevitable.

A representative algorithm that satisfies the above requirements from among wireless positioning algorithms for a wireless sensor network, which has been studied so far, is wireless centroid localization (WCL) algorithm. The WCL algorithm is effective in terms of speed and resources since a positioning operation is simply performed only by using coordinate information of each anchor node, which is different from other algorithms.

A reception range of an unknown node that is a positioning target is a circle based on the unknown node. A radius of the circle is indicated as a maximum reception distance limit point (dm). For positioning of the unknown node, the general WCL algorithm only considers anchor nodes within the circle, and uses position information of the anchor nodes. Also, in the general WCL algorithm, it is assumed that the anchor nodes within the circle have the same weight $w_j$, and thus a weight which equals 1 is assigned to the anchor nodes within the circle and a weight which equals 0 is assigned to anchor nodes outside the circle. When N anchor nodes satisfy the above conditions, the general WCL algorithm will be represented by Equation 1 below.

$$P(x, y) = \frac{\sum_{j=1}^{N} w_j A_j(x, y)}{\sum_{j=1}^{N} w_j} \quad \text{[Equation 1]}$$

Here, P(x,y) denotes position coordinates of an unknown node, and $A_j(x,y)$ denotes position coordinates of the j-th anchor node.

FIG. 1 is a graph showing the positioning simulation result of an unknown node using the general WCL algorithm in wireless sensor network of a 90×90 m² square space environment, wherein 100 anchor sensor nodes are arranged at intervals of 1 m, and 300 unknown sensor nodes are arranged. In FIG. 1, horizontal and vertical axes respectively denote horizontal and vertical areas in a 90×90 m² square space. ● denotes the position of an anchor node, * denotes the actual position of an unknown node, and ○ denotes the estimated position of each unknown node using general WCL algorithm. From FIG. 1, the localization error is higher when an unknown node is in the corner region or edge area compared with when it is in the center region of the square space. The increased degree of localization error is indicated by a length of a line connecting ○ and *.

FIG. 2 is a diagram schematically classifying the wireless sensor network of FIG. 1 into center region (gray region), edge region (white region), and corner region (black region). Here, each sizes of the four corner regions are 10×10 m², size of the center region is 70×70 m², and edge regions' are 10×70 m² or 70×10 m². The simulation result of the general WCL algorithm under in this environment is shown in FIG. 3.

FIG. 3 is a graph showing an average localization error according to the general WCL algorithm in each area of FIG. 2. In FIG. 3, the horizontal axis denotes a radius of a circle applied to an unknown node, and the vertical axis denotes average localization error. Here, the average localization error is higher when the unknown node is in edge and corner regions than when it is in a center region of a network. In detail, the localization error is highest when the unknown node is in the corner region. In other words, according to the general WCL algorithm, localization error increases near an edge and a corner in the wireless sensor network.

A background technology of the present invention is disclosed in KR 10-1163335.

SUMMARY OF THE INVENTION

The present invention provides a wireless positioning method and apparatus using a wireless sensor network, wherein a localization error generated in a general wireless centroid localization (WCL) algorithm is prevented.

According to an aspect of the present invention, there is provided a wireless positioning method using a wireless sensor network, for estimating a position of an unknown node that is a positioning target by using a plurality of anchor nodes arranged at regular intervals, the wireless positioning method including: setting a plurality of test nodes at regular intervals on a space formed by some of the plurality of anchor nodes; obtaining a number and position information of anchor nodes within a predetermined distance from the unknown node; detecting at least one test node matching the obtained number and position information of anchor nodes; and estimating a position of the unknown node by calculating an average coordinate value of the detected at least one test node.

The setting of the plurality of test nodes may include pre-mapping and storing a number and position information of anchor nodes within a predetermined distance from the test node, with respect to each test node.

The setting of the plurality of test nodes may include mapping the number and position information of the anchor nodes within the predetermined distance from the test node, with respect to each test node, wherein test nodes in which a same number of anchor nodes may be mapped are grouped and stored as at least one group according to the position information.

The detecting of the at least one test node may include primarily searching for a group matching the obtained number of anchor nodes, and secondarily searching for a test node matching the obtained position information of anchor nodes from the primarily found group.

An anchor node within the predetermined distance from the unknown node may be an anchor node whose reception signal intensity from the unknown node is equal to or higher than a threshold value, from among the plurality of anchor nodes.

According to another aspect of the present invention, there is provided a wireless positioning apparatus using a wireless sensor network, for estimating a position of an unknown node that is a positioning target by using a plurality of anchor nodes arranged at regular intervals, the wireless positioning apparatus including: a test node setter for setting a plurality of test nodes at regular intervals on a space formed by some of the plurality of anchor nodes; an anchor node information obtainer for obtaining a number and position information of anchor nodes within a predetermined distance from the unknown node; a test node information detector for detecting at least one test node matching the obtained number and position information of anchor nodes; and a position estimator for estimating a position of the unknown node by calculating an average coordinate value of the detected at least one test node.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

One or more embodiments of the present invention relate to a wireless positioning method and apparatus using a wireless sensor network. According to the present invention, the localization error generated in a general wireless centroid localization (WCL) algorithm is prevented and the localization error generated near the corner and edge of a wireless sensor network Is reduced.

Figure 1:
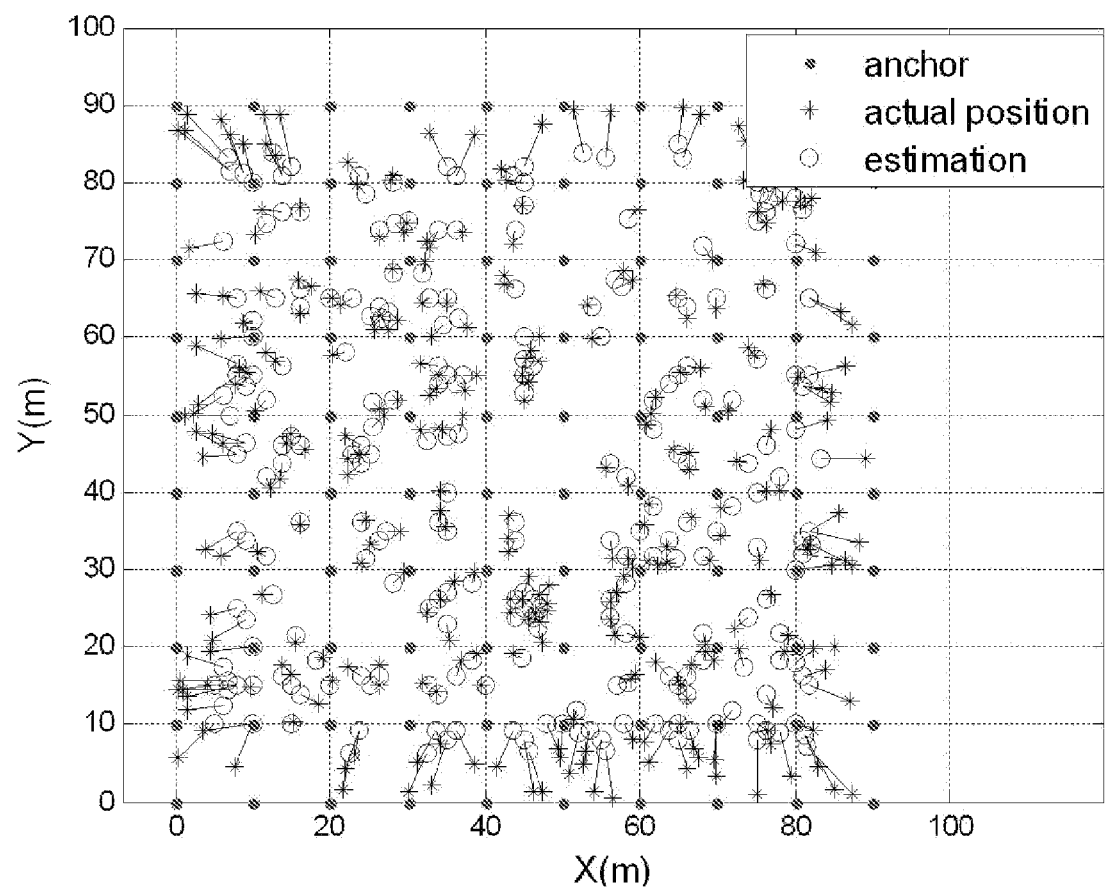
FIG. 1 is a graph showing a positioning simulation result of an unknown node using a general wireless centroid localization (WCL) algorithm in a wireless sensor network of a 90×90 m² square space environment.
Figure 2:
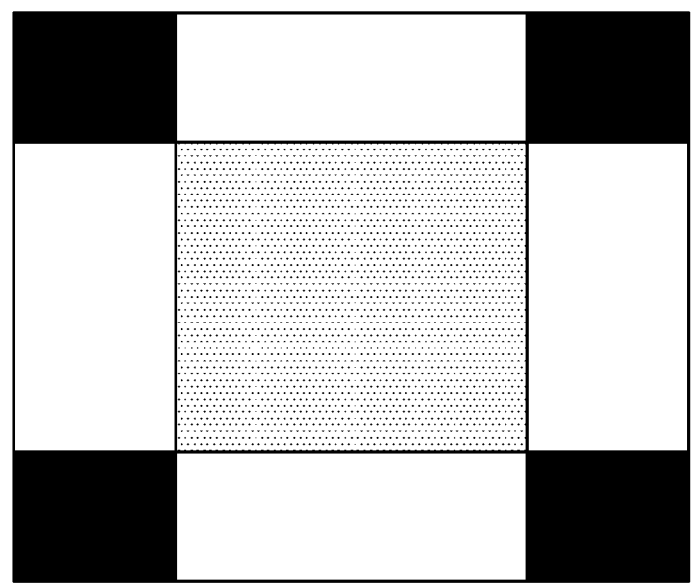
FIG. 2 is a diagram schematically classifying the wireless sensor network of FIG. 1 into a center region, an edge region, and a corner region.
Figure 3:
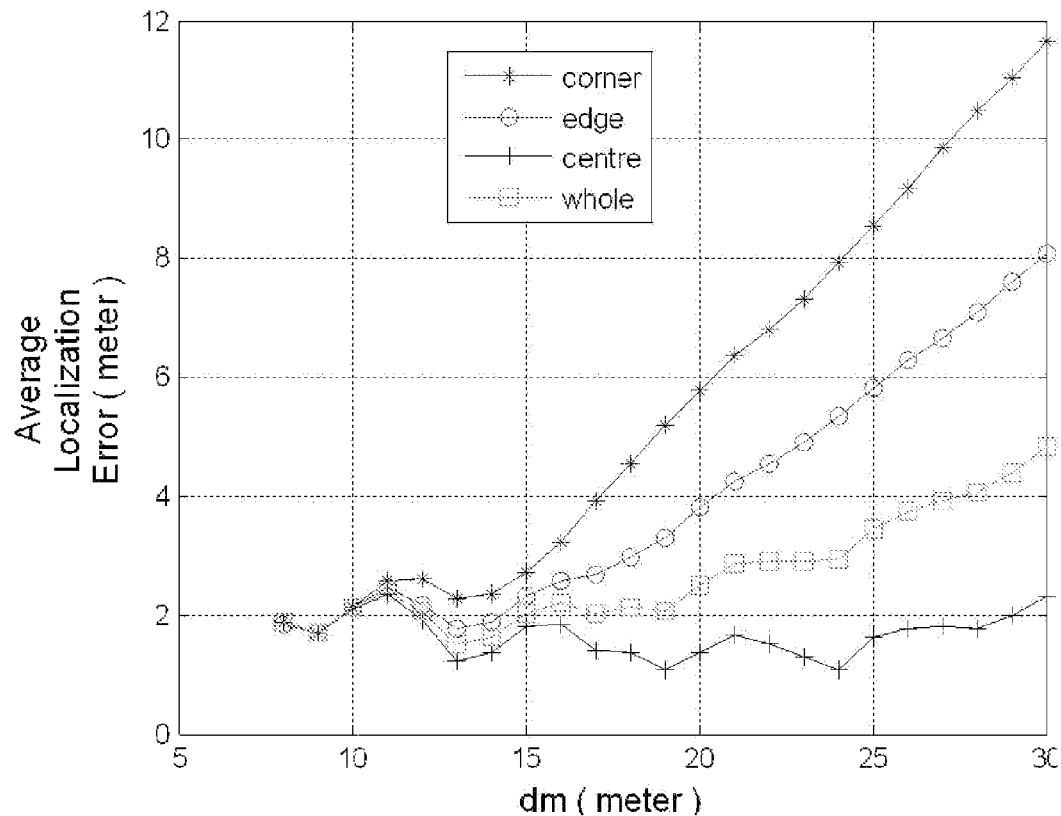
FIG. 3 is a graph showing an average localization error according to the general WCL algorithm in each area of FIG. 2.
Figure 4:
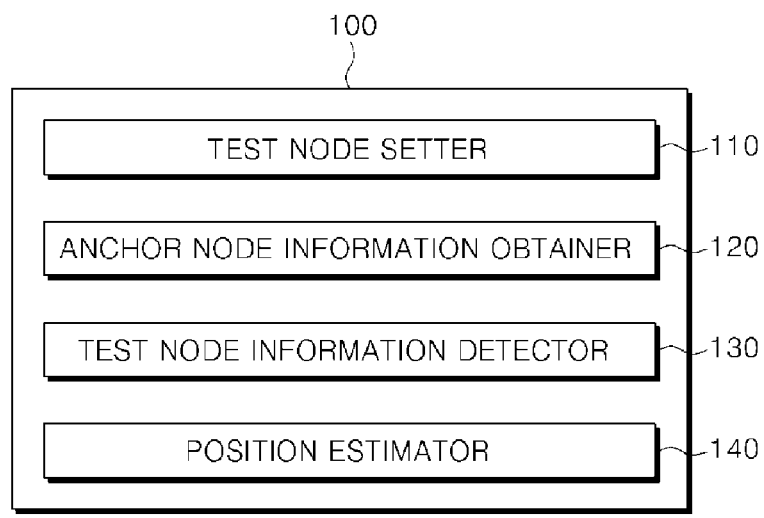
FIG. 4 is a block diagram of a wireless positioning apparatus using a wireless sensor network, according to an embodiment of the present invention.

FIG. 4 is a block diagram of a wireless positioning apparatus 100 using a wireless sensor network, according to an embodiment of the present invention. The wireless positioning apparatus 100 is an apparatus for estimating a position of an unknown node that is a positioning target, by using a plurality of anchor nodes arranged at regular intervals, and may correspond to a wireless positioning server. The wireless positioning apparatus 100 includes a test node setter 110, an anchor node information obtainer 120, a test node information detector 130, and a position estimator 140.

The test node setter 110 is a unit for setting a plurality of test nodes at regular intervals on a space formed by some of the plurality of anchor nodes. The anchor node information obtainer 120 obtains the number and position information of anchor nodes within a predetermined distance from the unknown node.

The test node information detector 130 detects at least one test node matching the obtained number and position information of the anchor nodes. The position estimator 140 estimates the position of an unknown node by calculating an average coordinate value of the detected at least one test node.

Figure 5:
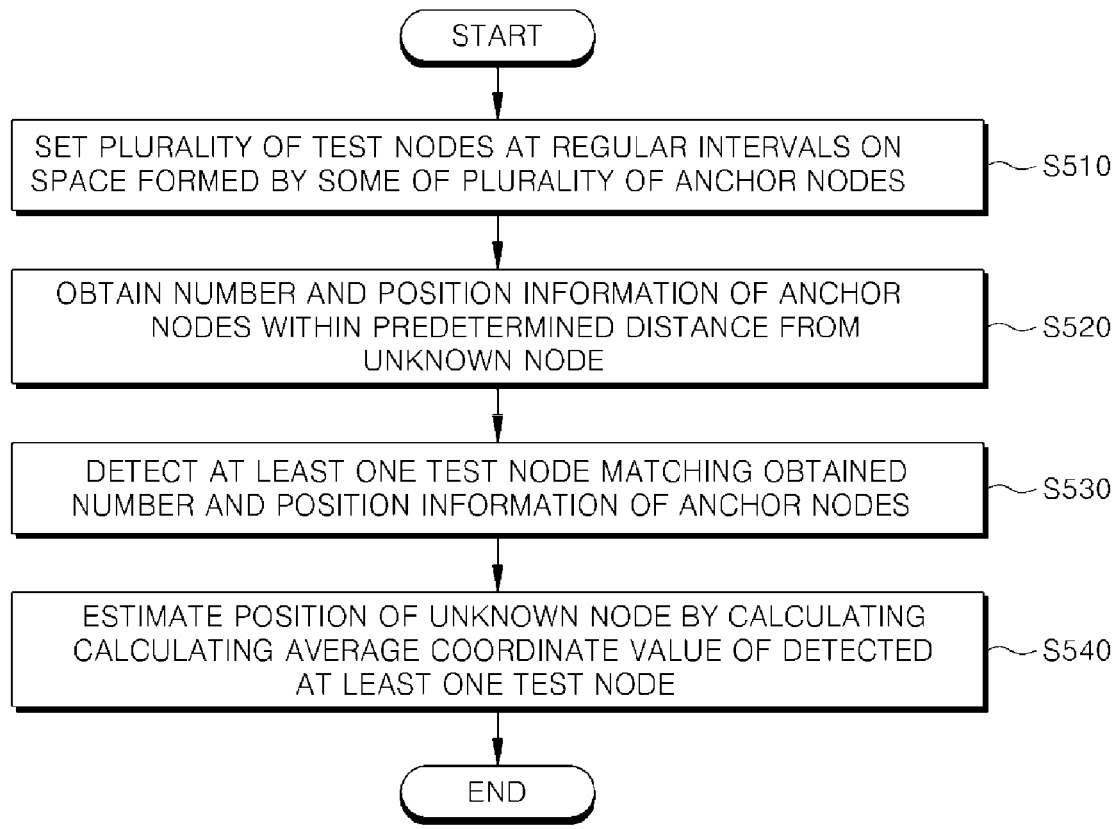
FIG. 5 is a flowchart illustrating a wireless positioning method using the wireless positioning apparatus of FIG. 4.

FIG. 5 is a flowchart illustrating a wireless positioning method using the wireless positioning apparatus of FIG. 4. The wireless positioning method will now be described in detail with reference to FIGS. 4 and 5.

First, the test node setter 110 sets the plurality of test nodes at regular intervals on the space formed by some of the plurality of anchor nodes that are arranged at regular intervals, in operation S510.

Figure 6:
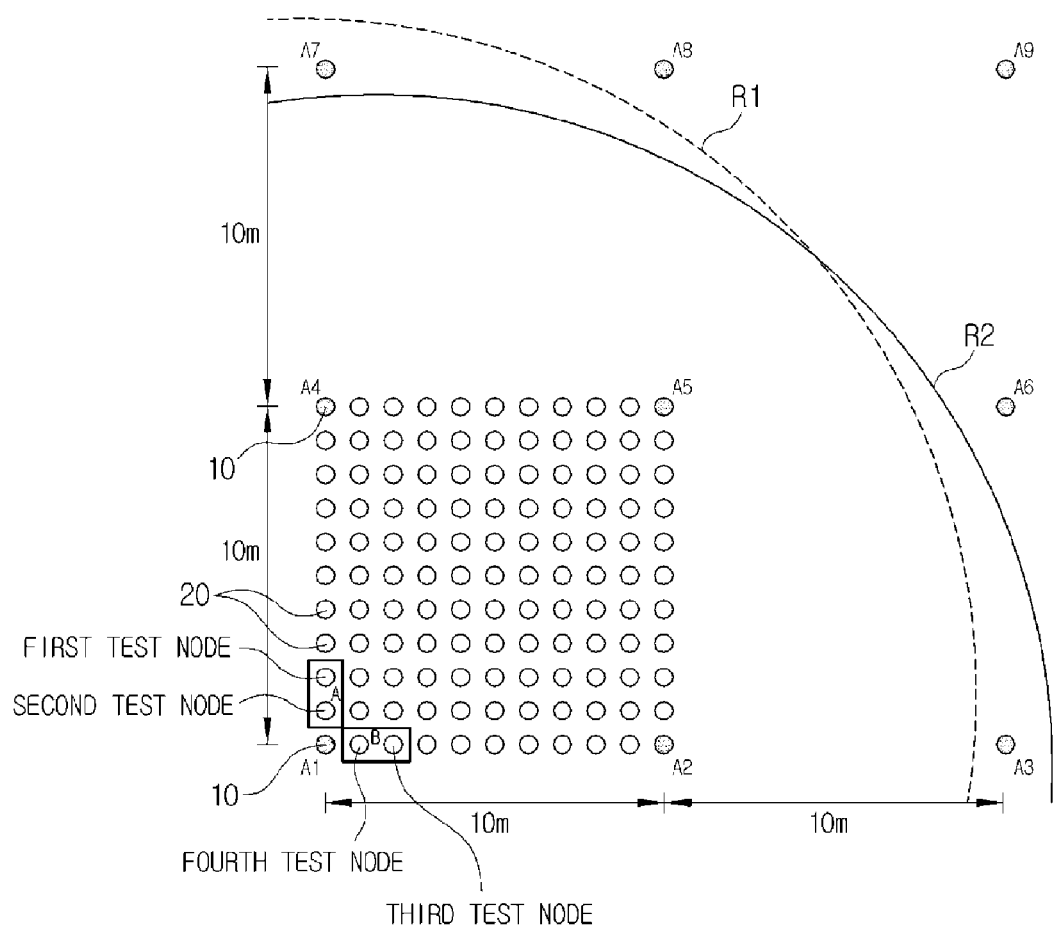
FIG. 6 is a diagram of a square wireless sensor network including a plurality of anchor nodes, according to an embodiment of the present invention.

A wireless sensor network environment applied to the current embodiment will be described so as to describe operation S510 now. FIG. 6 is a diagram of a square wireless sensor network including a plurality of anchor nodes 10, according to an embodiment of the present invention.

Referring to FIG. 6, a wireless sensor network environment considers a 10×10 m² square space, wherein the anchor nodes 10 are arranged at intervals of 10 m. For convenience of description, 9 anchor nodes 10 are shown in FIG. 6, but the number of anchor nodes 10 is not limited to 9.

In FIG. 6, it is assumed that an unknown node that is a positioning target is located in a region A or a region B near a left bottom corner of the wireless sensor network. Also, a plurality of test nodes 20, i.e., 121 test nodes 20 are arranged on the 10×10 m² square space at intervals of 1 m.

In FIG. 6, only the anchor nodes 10 are shown at four corners of the 10×10 m² square space for convenience of description. A test node may be arranged in the same manner on square spaces other than the 10×10 m² square space shown in FIG. 6.

In operation S510, the test node setter 10 pre-maps and stores the number and position information of the anchor nodes 10 within a predetermined distance from the test nodes 20, with respect to each test node 20. Information about the test node 20 obtained as such corresponds to a type of learning data pre-prepared to perform positioning on the unknown node.

Here, the predetermined distance denotes a reception radius R. If reception signal intensity of a signal received from a certain anchor node 10 on the test node 20 is equal to or higher than a threshold value, the certain anchor node 10 may be within the reception radius R from the test node 20.

Accordingly, the anchor node 10 within the predetermined distance from the test node 20 is the anchor node 10 whose reception signal intensity from the corresponding test node 20 is equal to or higher than the threshold value, from among the plurality of anchor nodes 10. In the same manner, the anchor node 10 within the predetermined distance from the unknown node whose position is to be determined is the anchor node 10 whose reception signal intensity from the unknown node is equal to or higher than the threshold value, from among the plurality of anchor nodes 10.

Hereinafter, it is assumed that the reception radius R is 20 m, but is not limited thereto.

In FIG. 6, a broken line R1 shows an area corresponding to the reception radius R based on a first test node included in the region A. 5 anchor nodes at positions A1, A2, A4, A5, and A7 are within the reception radius R based on the first test node, and the same 5 anchor nodes at the positions A1, A2, A4, A5, and A7 are within the reception radius R based on a second test node.

In the similar manner, if the unknown node whose position is not known is somewhere in the region A, the same 5 anchor nodes the positions A1, A2, A4, A5, and A7 are within the reception radius R based on the unknown node.

An alternated long and short dash line R2 also shows an area corresponding to the reception radius based on a third test node included in the region B. 5 anchor nodes at positions A1, A2, A3, A4, and A5 are within the reception radius R based on the third test node, and the same 5 anchor nodes at the positions A1, A2, A3, A4, and A5 are within the reception radius R based on a fourth test node.

Of course, in the similar manner, if the unknown node whose position is not known is somewhere in the region B, the same 5 anchor nodes at the positions A1, A2, A3, A4, and A5 are within the reception radius R based on the unknown node.

According to nodes in the regions A and B, the numbers of anchor nodes within the reception radius R are the same, i.e., 5, but the positions of the anchor nodes are partially different. In other words, the nodes in the regions A and B may be adjacent to each other but may be estimated at different positions in the current embodiment.

As described above, the number and position information of the anchor nodes 10 within the predetermined distance from each test node 20 are determined. In other words, in operation S510, the number and position information of the anchor nodes 10 within the predetermined distance from the test nodes 20 are pre-mapped and stored according to the test nodes 20.

Figure 7:
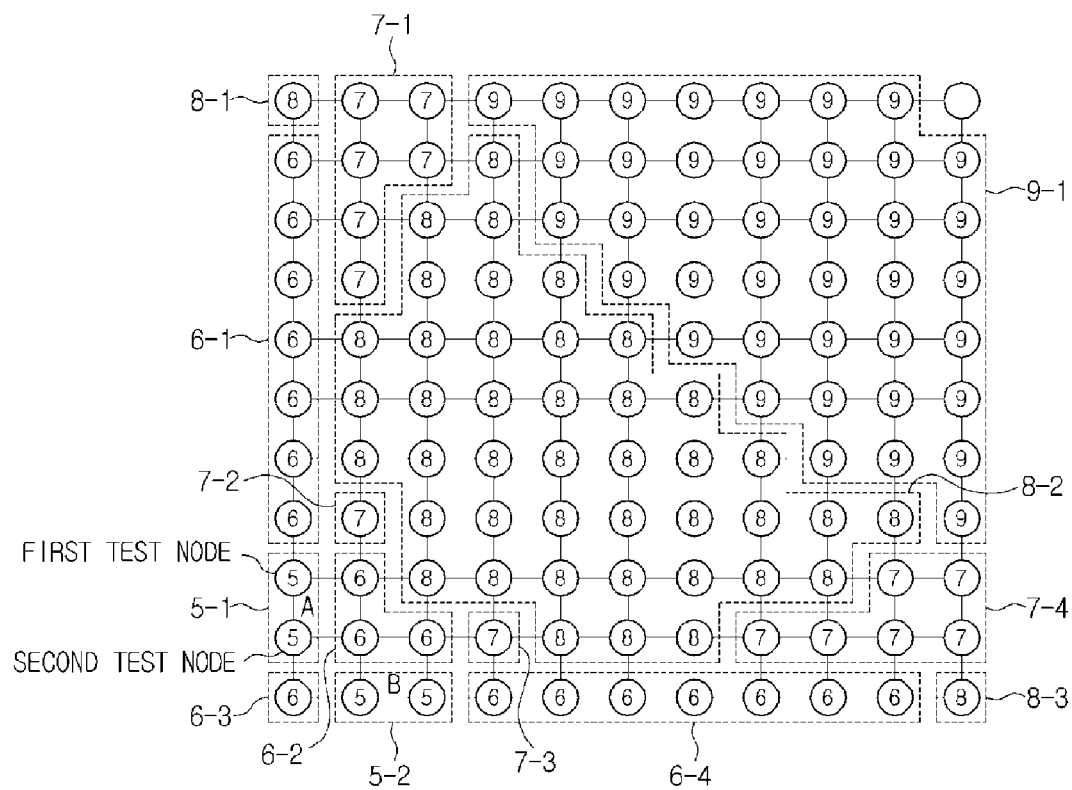
FIG. 7 is a diagram illustrating a result of numbering and mapping a number of anchor nodes within a reception radius per test node in operation S510 of FIG. 5.

FIG. 7 is a diagram illustrating a result of numbering and mapping a number of anchor nodes within the reception radius R per test node in operation S510 of FIG. 5. Here, regions A and B of FIG. 7 respectively correspond to the regions A and B of FIG. 6. Also, four corners correspond to the positions A1, A2, A4, and A5 of FIG. 6.

In FIG. 7, the test nodes are numbered according to operation S510. A number corresponding to the number of anchor nodes within the reception radius R is mapped on each test node. In other words, when the number of anchor nodes within the reception radius R is 5, a corresponding test node is mapped with 5, and when the number of anchor nodes within the reception radius R is 6, a corresponding test node is mapped with 6.

Here, while setting a test node, the number and position information of anchor nodes are mapped and stored with respect to each test node, wherein test nodes mapped with the same numbers of anchor nodes are grouped and stored in at least one group according to the position information.

For example, test nodes having 5 anchor nodes within the reception radius R may be grouped into 2 groups 5-1 and 5-2 as shown in FIG. 7 according to similarity of position information of the anchor nodes. Alternatively, test nodes having 7 anchor nodes within the reception radius R may be grouped into 4 groups 7-1, 7-2, 7-3, and 7-4, and test nodes having 9 anchor nodes within the reception radius R may be grouped into one group 9-1.

As such, when a numbering map with respect to the test nodes is set, the position of the unknown node that is a positioning target may be estimated based on the numbering map. In other words, after operation S510, the anchor node information obtainer 120 obtains a number and position information of anchor nodes within the predetermined distance from the unknown node whose position is to be determined, in operation S520.

If the unknown node is in the region A, the number of anchor nodes within the predetermined distance from the unknown node is 5 and are anchor nodes at the positions A1, A2, A4, A5, and A7 as described above with reference to FIG. 6.

Then, in operation S530, the test node information detector 130 detects at least one test node matching the number and position information of anchor nodes according to the test nodes obtained in operation S520

In FIG. 7, even when the same numbers of anchor nodes are mapped with respect to test nodes, the test nodes are grouped into one or more groups according to positions of the test nodes. Here, there are 4 test nodes that have 5 anchor nodes within the reception radius R, and the 4 test nodes are grouped into groups 5-1 and 5-2 according to positions of the 4 test nodes.

Thus, in operation S530, a group of test nodes mapped with a number matching a number of anchor nodes determined to be within the predetermined distance from the unknown node is primarily searched for. Then, test nodes matching the obtained positions of the anchor nodes are secondarily searched for from the primarily found group.

For example, the number of anchor nodes within the reception radius R from the unknown node in the region A of FIG. 7 is 5, and the position information of the anchor nodes is obtained to be the positions A1, A2, A4, A5, and A7. Then, the groups 5-1 and 5-2 are primarily found as the groups of test nodes mapped with the same number, i.e., 5.

Then, test nodes, for example, the first and second test nodes, matching the positions A1, A2, A4, A5, and A7 of the anchor nodes within the reception radius R from the unknown node are searched for in the two groups 5-1 and 5-2.

Next, in operation S540, the position estimator 140 estimates the position of the unknown node by calculating the average coordinate value of the test nodes detected in operation S530. If a coordinate of the first test node is (0,1) and a coordinate of the second test node is (0,2) based on a meter unit, the position of the unknown node in the region A is estimated to be (0,1.5) that is an average value of the coordinates of the first and second test nodes.

In a general WCL algorithm, when an unknown node is in the region A, a coordinate of the unknown is estimated to be (4,8) that is an average value of coordinates (0,0), (10,0), (0,10), (10,10), and (0,20) at positions A1, A2, A4, A5, and A7 within the reception radius R. Comparing the general WCL algorithm with the current embodiment a localization error is remarkably high in the general WCL algorithm.

Figure 8:
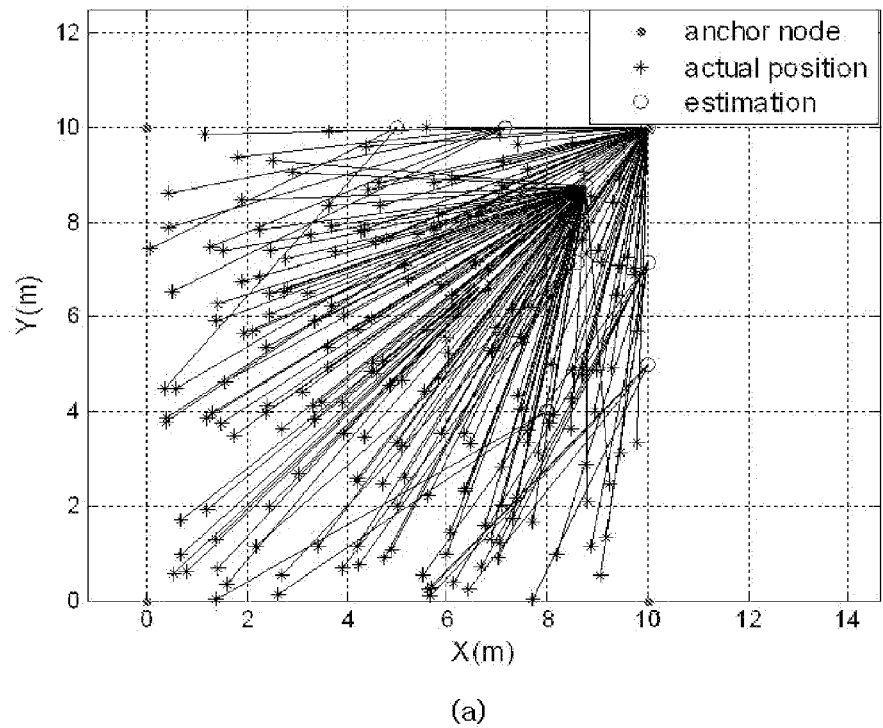
FIG. 8 is graphs for comparing a positioning result according to an embodiment of the present invention and a positioning result according to a general WCL algorithm.
Figure 8:
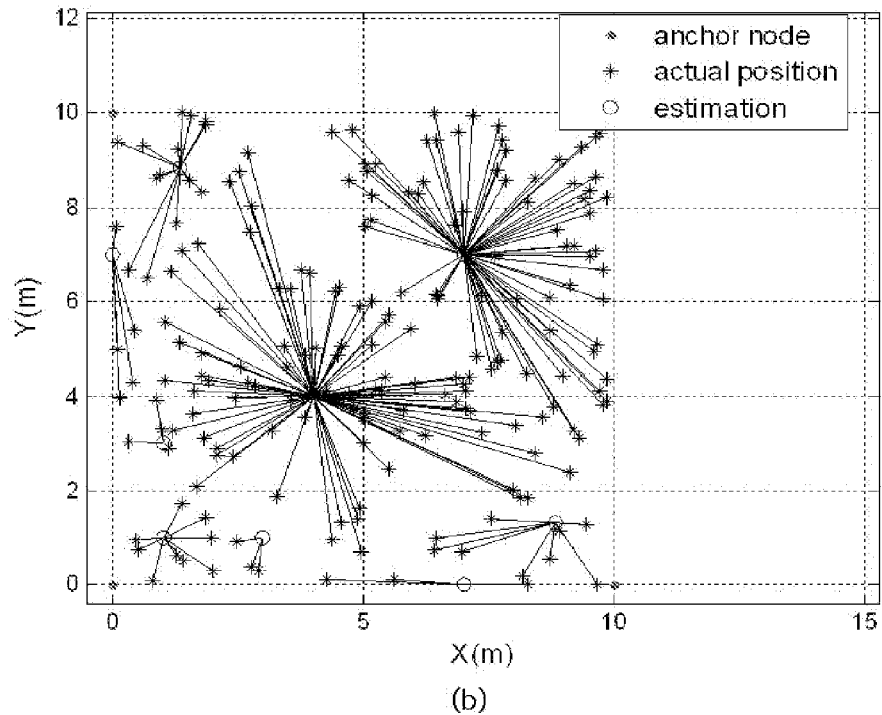

FIG. 8 is graphs for comparing a positioning result according to the current embodiment of the present invention and a positioning result according to the general WCL algorithm. FIG. 8 (a) shows the positioning result according to the general WCL algorithm and FIG. 8 (b) shows the positioning result according to the current embodiment.

In FIG. 8, a horizontal axis and a vertical axis respectively denote a horizontal region and a vertical region in a square space. ● denotes a position of an anchor node, * denotes an actual position of an unknown node, and ○ denotes an estimated position of the unknown node.

In FIG. 8 (a) using the general WCL algorithm, an error of the estimated position with respect to the actual position is remarkably large. However, in FIG. 8 (b) according to the current embodiment, it is accurately determined whether the unknown node is in the region A or in the region B. If the unknown node is in the region A, a center coordinate (0,1.5) of the region A is determined to be the estimated position, and if the unknown node is in the region B, a center coordinate (1.5,0) of the region B is determined to be the estimated position. Accordingly, positioning accuracy is remarkably high in the current embodiment compared to the general WCL algorithm.

Figure 9:
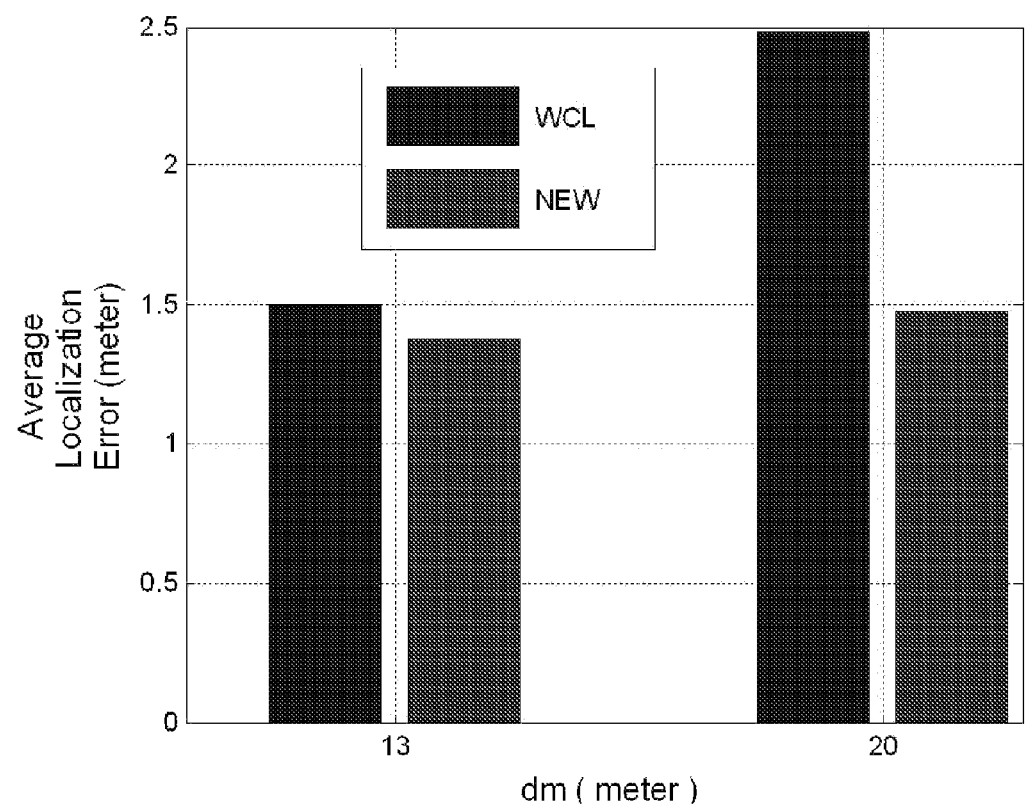
FIG. 9 is a graph for comparing simulation results of a general WCL technology and a technology according to an embodiment of the present invention, when a reception radius is 13 m, in which an average localization error is relatively satisfactory, and when a reception radius is 20 m, in which an average localization error is relatively poor.

FIG. 9 is a graph for comparing simulation results of a general WCL technology and a technology according to an embodiment of the present invention, when a reception radius is 13 m, in which an average localization error is relatively satisfactory, and when a reception radius is 20 m, in which an average localization error is relatively poor. In FIG. 9, a horizontal axis denotes a reception radius and a vertical axis denotes an average localization error. As shown in FIG. 9, a positioning method of the current embodiment is improved compared to that of the general WCL technology in both cases when the reception radii are 13 m and 20 m.

According to the wireless positioning method and apparatus using the wireless sensor network, an average localization error of an entire region may be reduced since a position of an unknown node near an edge or corner of the wireless sensor network is accurately estimated unlike when a general WCL algorithm is used.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A wireless positioning method using a wireless sensor network, for estimating a position of an unknown node that is a positioning target by using a plurality of anchor nodes arranged at regular intervals, the wireless positioning method comprising:
    setting a plurality of test nodes at regular intervals on a space formed by some of the plurality of anchor nodes;
    obtaining a number and position information of anchor nodes within a predetermined distance from the unknown node;
    detecting at least one test node matching the obtained number and position information of anchor nodes; and
    estimating a position of the unknown node by calculating an average coordinate value of the detected at least one test node.

2. The wireless positioning method of claim 1, wherein the setting of the plurality of test nodes comprises pre-mapping and storing a number and position information of anchor nodes within a predetermined distance from the test node, with respect to each test node.

3. The wireless positioning method of claim 1, wherein the setting of the plurality of test nodes comprises mapping the number and position information of the anchor nodes within the predetermined distance from the test node, with respect to each test node, wherein test nodes in which a same number of anchor nodes are mapped are grouped and stored as at least one group according to the position information.

4. The wireless positioning method of claim 3, wherein the detecting of the at least one test node comprises primarily searching for a group matching the obtained number of anchor nodes, and secondarily searching for a test node matching the obtained position information of anchor nodes from the primarily found group.

5. The wireless positioning method of claim 1, wherein an anchor node within the predetermined distance from the unknown node is an anchor node whose reception signal intensity from the unknown node is equal to or higher than a threshold value, from among the plurality of anchor nodes.

6. A wireless positioning apparatus using a wireless sensor network, for estimating a position of an unknown node that is a positioning target by using a plurality of anchor nodes arranged at regular intervals, the wireless positioning apparatus comprising:
    a test node setter for setting a plurality of test nodes at regular intervals on a space formed by some of the plurality of anchor nodes;
    an anchor node information obtainer for obtaining a number and position information of anchor nodes within a predetermined distance from the unknown node;
    a test node information detector for detecting at least one test node matching the obtained number and position information of anchor nodes; and
    a position estimator for estimating a position of the unknown node by calculating an average coordinate value of the detected at least one test node.

7. The wireless positioning apparatus of claim 6, wherein the test node setter pre-maps and stores a number and position information of anchor nodes within a predetermined distance from the test node, with respect to each test node.

8. The wireless positioning apparatus of claim 6, wherein the test node setter maps the number and position information of the anchor nodes within the predetermined distance from the test node, with respect to each test node, wherein test nodes in which a same number of anchor nodes are mapped are grouped and stored as at least one group according to the position information.

9. The wireless positioning apparatus of claim 8, wherein the test node information detector primarily searches for a group matching the obtained number of anchor nodes, and secondarily searches for a test node matching the obtained position information of anchor nodes from the primarily found group.

10. The wireless positioning apparatus of claim 6, wherein an anchor node within the predetermined distance from the unknown node is an anchor node whose reception signal intensity from the unknown node is equal to or higher than a threshold value, from among the plurality of anchor nodes.

* * * * *